US012325522B1

(12) United States Patent
Roberts et al.

(10) Patent No.: US 12,325,522 B1
(45) Date of Patent: Jun. 10, 2025

(54) MOVABLE WALL SECTION FOR REDUCED MOBILITY PASSENGER ACCESS

(71) Applicant: B/E Aerospace, Inc., Winston-Salem, NC (US)

(72) Inventors: Edgar Roberts, Kings Mountain, NC (US); Ryan M. Rufty, High Point, NC (US); Lyle T. Davis, Pfafftown, NC (US); Rodney M. Hardy, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/654,560

(22) Filed: May 3, 2024

(51) Int. Cl.
B64D 11/00 (2006.01)
B64D 11/06 (2006.01)

(52) U.S. Cl.
CPC ...... B64D 11/0023 (2013.01); B64D 11/0602 (2014.12)

(58) Field of Classification Search
CPC .......... B64D 11/0023; B64D 11/0602
See application file for complete search history.

(56) References Cited

U.S. PATENT DOCUMENTS

| 10,422,170 | B2 * | 9/2019 | Trentin | ............ E05D 3/10 |
| 2017/0283064 | A1 | 10/2017 | Robinson | |
| 2019/0359335 | A1 | 11/2019 | Hough et al. | |
| 2022/0177136 | A1 | 6/2022 | McIntosh et al. | |
| 2023/0365261 | A1 | 11/2023 | Yates | |
| 2024/0158082 | A1 * | 5/2024 | Ruiz Lara | ...... B64D 11/0023 |

* cited by examiner

Primary Examiner — Valentina Xavier
(74) Attorney, Agent, or Firm — Suiter Swantz IP

(57) ABSTRACT

A wall assembly for a passenger cabin such as an aircraft passenger suite. The assembly includes a first fixed wall, a second fixed wall positioned relative to the first fixed wall to define an interior space, an entrance formed between the first fixed wall and the second fixed wall for accessing the interior space, and a movable wall section movably mounted to the first fixed wall. In use, the movable wall section is movable between a first position in the entrance and a second position in the interior space, wherein motion includes at least rotational and vertical motion components. In a particular use case, the wall portion is temporarily movable to expand the entrance to facilitate reduced mobility passenger access into the interior space.

20 Claims, 15 Drawing Sheets

MOVABLE WALL SECTION FOR REDUCED MOBILITY PASSENGER ACCESS

TECHNICAL FIELD AND BACKGROUND

The present disclosure relates generally to reduced mobility passenger access in aircraft and other conveyances, and more particularly, to a movable wall section configured to both rotate and lift to facilitate reduced mobility passenger access through an entrance.

Passenger cabins in aircraft and other conveyances typically include passenger seats, lavatories, galleys, monuments, partitions, etc., in various configurations and layouts. Premium class passenger cabins may further include individual passenger suites. Passenger suites and lavatories typically include an interior space in which access is gained through an entrance formed between spaced upstanding walls.

Passenger cabins are typically configured to maximize seating density to increase passenger carrying capacity and therefore revenue. As such, the dimensions of aisles and entrances are minimized to allow for a greater number of passenger seats. While standard mobility passengers may make use of smaller aisles and entrances, reduced mobility passengers may have difficulties traversing such aisles and entrances. For example, wheelchairs such as transfer wheelchairs may have difficulty making direction changes and transitions from an aisle to an entrance, and vice versa, whereas crew may have difficulties transferring a passenger from a wheelchair to a passenger seat within the confines of a small entrance and interior space.

Therefore, what is needed is a solution for temporarily expanding an entrance and/or interior space in a passenger cabin to facilitate reduced mobility passenger access.

BRIEF SUMMARY

According to one aspect, the inventive concepts according to the present disclosure are directed to a wall assembly for a passenger cabin. In embodiments, the wall assembly includes a first fixed wall, a second fixed wall positioned relative to the first fixed wall to define an interior space, an entrance formed between the first fixed wall and the second fixed wall for accessing the interior space, and a movable wall section movably mounted to the first fixed wall. In use, the movable wall section is movable between a first position in the entrance, and a second position in the interior space, wherein motion to move the movable wall section between the first position and the second position includes a rotational motion component and a vertical motion component.

In some embodiments, the motion to move the movable wall section between the first position and the second position further includes a horizontal motion component.

In some embodiments, the rotational motion component, the vertical motion component, and the horizontal motion component are performed sequentially according to a predefined motion sequence.

In some embodiments, the vertical motion component is upward as the movable wall section moves from the first position to the second position, and the vertical motion component is downward as the movable wall section moves from the second position to the first position.

In some embodiments, the vertical motion component is at least 6 inches, and the movable wall section has a length between about 4 inches and about 6 inches.

In some embodiments, the movable wall section comprises an overhanging portion that overhangs the first fixed wall when the movable wall section is in the second position.

In some embodiments, the first fixed wall is oriented perpendicular to the entrance, the second fixed wall is oriented perpendicular to the first fixed wall and parallel to the entrance, the movable wall section when in the first position is oriented perpendicular to the first fixed wall and parallel to the second fixed wall, and the movable wall section when in the second position is oriented parallel to the first fixed wall and perpendicular to the second fixed wall.

In some embodiments, an interface between the first fixed wall and the movable wall section includes at least one hinge mechanism, and preferably at least two spaced hinge mechanisms. In embodiments, each hinge mechanism includes a rotation constraining member mounted to the first fixed wall, a translating support mounted to the first fixed wall, an angled bar rotatably mounted to the translating support, and at least one bracket slidably mounted to the angled bar and fixedly mounted to the movable wall section.

In some embodiments, an interface between the first fixed wall and the movable wall section includes an interior wall panel rotatably mounted to the first fixed wall, a rail diagonally mounted to the interior wall panel, an exterior wall panel, and a carriage slidably mounted to the rail and fixedly mounted to the exterior wall panel.

According to another aspect, the inventive concepts according to the present disclosure are directed to an aircraft passenger suite including a first fixed wall, a second fixed wall positioned relative to the first fixed wall to define an interior space, an entrance formed between the first fixed wall and the second fixed wall for accessing the interior space, a floor pallet positioned in the interior space, a portion of the floor pallet positioned at the entrance, and a movable wall section movably mounted to the first fixed wall, the movable wall section movable between a first position in the entrance, and a second position in the interior space, wherein motion to move the movable wall section between the first position and the second position includes a rotational motion component and a vertical motion component. In use, the movable wall section is configured to be moved from the first position to the second position to expand the entrance.

In some embodiments, at least a portion of the rotational motion component, the vertical motion component, and the horizontal motion component are performed sequentially according to a predefined motion sequence, and at least a portion of the rotational motion component, the vertical motion component, and the horizontal motion component are performed synchronously.

In some embodiments, the vertical motion component is upward as the movable wall section moves from the first position to the second position, and the vertical motion component is downward as the movable wall section moves from the second position to the first position.

According to a further aspect, the inventive concepts according to the present disclosure are directed to a wall assembly including a fixed wall, and a movable wall movably mounted to the fixed wall, the movable wall movable between a first position perpendicular to the fixed wall and a second position parallel to the fixed wall, wherein the movable wall when in the second position is at least 6 inches higher that the movable wall when in the first position.

In some embodiments, the movable wall comprises an overhanging portion that overhangs the fixed wall when the movable wall is in the second position.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
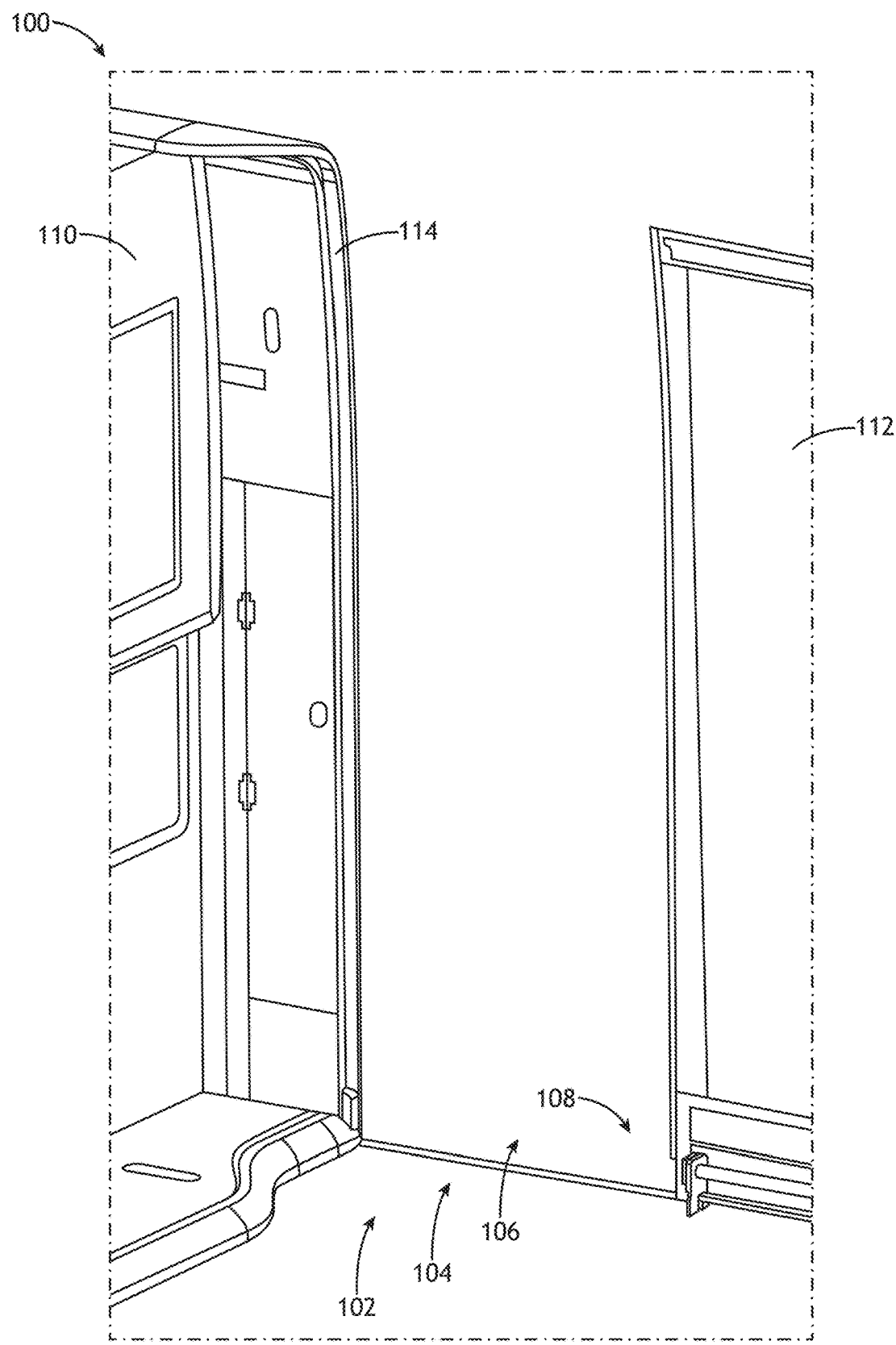
FIG. 1 is a perspective view of a movable wall section associated with an entrance in a passenger cabin of an aircraft, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a movable wall section. In a particular conceived example, the movable wall section is movably mounted to a fixed wall section, and is configured to be moved between a first position and a second position, wherein the first position corresponds to regular use and the second position corresponds to temporary use. In embodiments, when in the first position, the movable wall section defines a lateral boundary of an entrance into an interior space, and when in the second position, the movable wall section moves out of the way to expand the entrance. For example, the entrance may be temporarily expanded to facilitate reduced mobility passenger access into the interior space.

In embodiments, the motion of the movable wall section includes a vertical motion component such that the movable wall section is raised when in the second position as compared to when in the first position. For example, the movable wall section may raise to clear at least one of the fixed wall to which the movable is section is attached, and an obstruction on the floor such as a floor pallet. Additional motion components may include at least one of rotational and horizontal translation motion components. Motions may be synchronous, sequential, or combinations thereof, depending on the interface (e.g., hardware) mounting the movable wall section to the fixed wall.

FIG. 1 illustrates a wall assembly 100 for installation in an environment such as a passenger cabin in an aircraft or other conveyance. The wall assembly 100 may be part of a passenger suite 102 having an interior space 104 and an entrance 106 for gaining access to the interior space 104. Although not shown, a passenger seat may be positioned in the interior space along with other suite elements including, but limited to, a console, furniture, a desk, entertainment equipment, etc. The passenger suite 102 may be positioned alongside an aisle 108, for instance a longitudinal aisle, such that the passenger and crew can access the passenger suite 102 directly from the aisle 108.

In embodiments, the wall assembly 100 includes a first fixed wall 110, and a second fixed wall 112 positioned relative to the first fixed wall to define the interior space 104. The entrance 106 is formed between the first fixed wall 110 and the second fixed 112. The wall assembly 100 further includes a movable wall section 114 movably mounted to the first fixed wall 110. The movable wall section 114 is movable between a first position and a second position. When in the first position as shown in FIG. 1, the movable wall section 114 is positioned in and forms one side of the entrance 106. When in the second position (see FIG. 2), the movable wall section 114 is moved out of the entrance 106 and into the interior space 104 to expand the entrance 106, and more specifically, expand the width of the entrance 106. The movable wall section 114 may be moved to the second position on a temporary basis to expand the entrance to facilitate reduced mobility passenger access, for example, to provide more room for a flight crew to transfer a passenger from a transfer wheelchair to a passenger seat positioned in the suite.

In some embodiments, the first fixed wall 110 may be oriented perpendicular or substantially perpendicular to the entrance 106, and the second fixed wall 112 may be oriented perpendicular or substantially perpendicular to the first fixed wall 110 and parallel or substantially parallel to the entrance 106. In some embodiments, the movable wall section 114, when in the first position, may be oriented perpendicular or substantially perpendicular to the first fixed wall 110 and parallel or substantially parallel to the second fixed wall 112. In some embodiments, the movable wall section 114, when in the second position, may be oriented parallel or substantially parallel to the first fixed wall 110 and perpendicular or substantially perpendicular to the second fixed wall 112. In this configuration, the entrance 106 is formed between the second fixed wall 112 and the movable wall section 114 when in the first position, and the movable wall section 114 is moved into position against the first fixed wall 110 when in the second position to expand the entrance.

Figure 2:
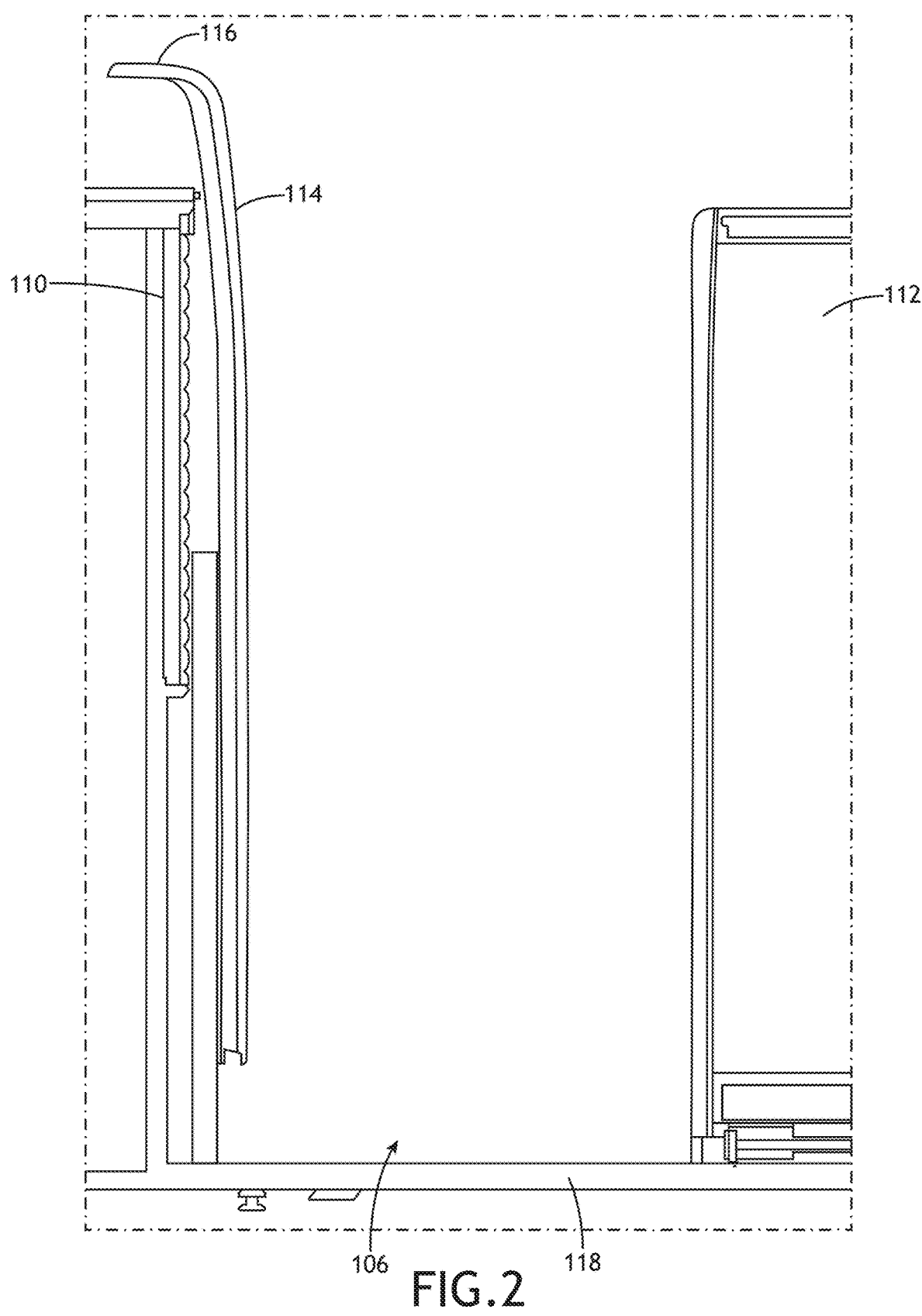
FIG. 2 is an elevation view showing the movable wall section rotated and lifted to temporarily expand the associated entrance, in accordance with example embodiments of this disclosure.

FIG. 2 illustrates the movable wall section 114 in the second position to expand the entrance 106. As evident comparing FIGS. 1 and 2, the movable wall section 114 is higher when in the second position as compared to when in the first position. In some embodiments, the movable wall section 114 has an overhanging top portion 116 that overhangs the first fixed wall 110 when in the second position. By raising the movable wall section 114 for movement to the second position, the overhanging top portion 116 is positioned above the first fixed wall 110 such that movable wall section 114 is clear to be rotated to the second position. In addition, when in the second position, the movable wall section 114 becomes elevated above the floor.

In some embodiments, the floor may be at least partially formed by a floor pallet 118 positioned in the interior space, wherein a portion of the floor pallet 118 is positioned at the entrance 106. By raising the movable wall portion 114, the bottom edge of the movable wall portion 114 not only clears the pallet 118, but also provides foot clearance above the floor to facilitate passenger transfer. In a non-limiting embodiment, the vertical motion of the movable wall section 114 may be about 4 inches, and more preferably at least 6 inches. In embodiments, a length of the movable wall section 114 may range from about 4 inches to about 6 inches such that, when the entrance 106 is expanded, the width of the entrance gains at least about 4 inches.

Figure 3:
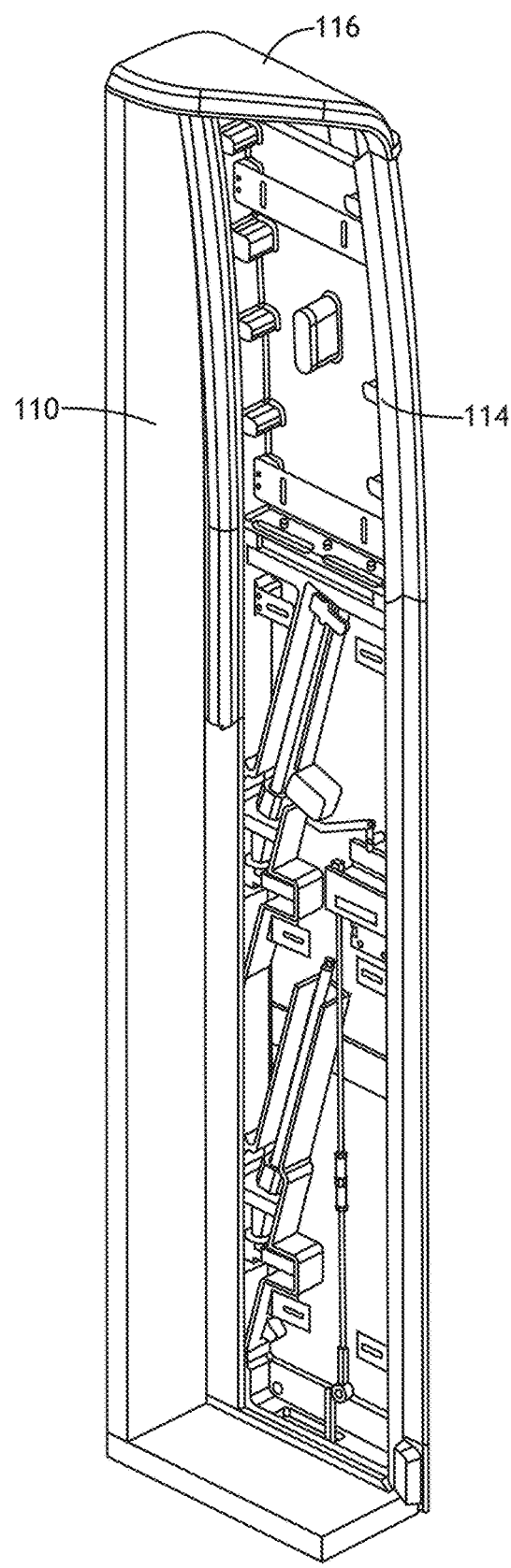
FIG. 3 is a perspective view showing a first example of a movable wall section, in accordance with example embodiments of this disclosure.

FIGS. 3-6 illustrate a first example of the movable wall section 114 according to the present disclosure. FIG. 3 illustrates the movable wall section 114 in the first position forming part of the entrance. As shown, the movable wall section 114 includes the overhanging top portion 118. In embodiments, motion to move the movable wall section 114 between the first position and the second position includes a rotational motion component and a vertical motion component. In some embodiments, the motion may further include a translational motion component. Depending on the hinge mechanism(s) associated with the movable wall section 114, at least a portion of the rotational motion component, the vertical motion component, and the translational motion component may be performed sequentially according to a predefined motion sequence, and at least a portion of the rotational motion component, the vertical motion component, and the translational motion component may be performed synchronously.

Figure 4A:
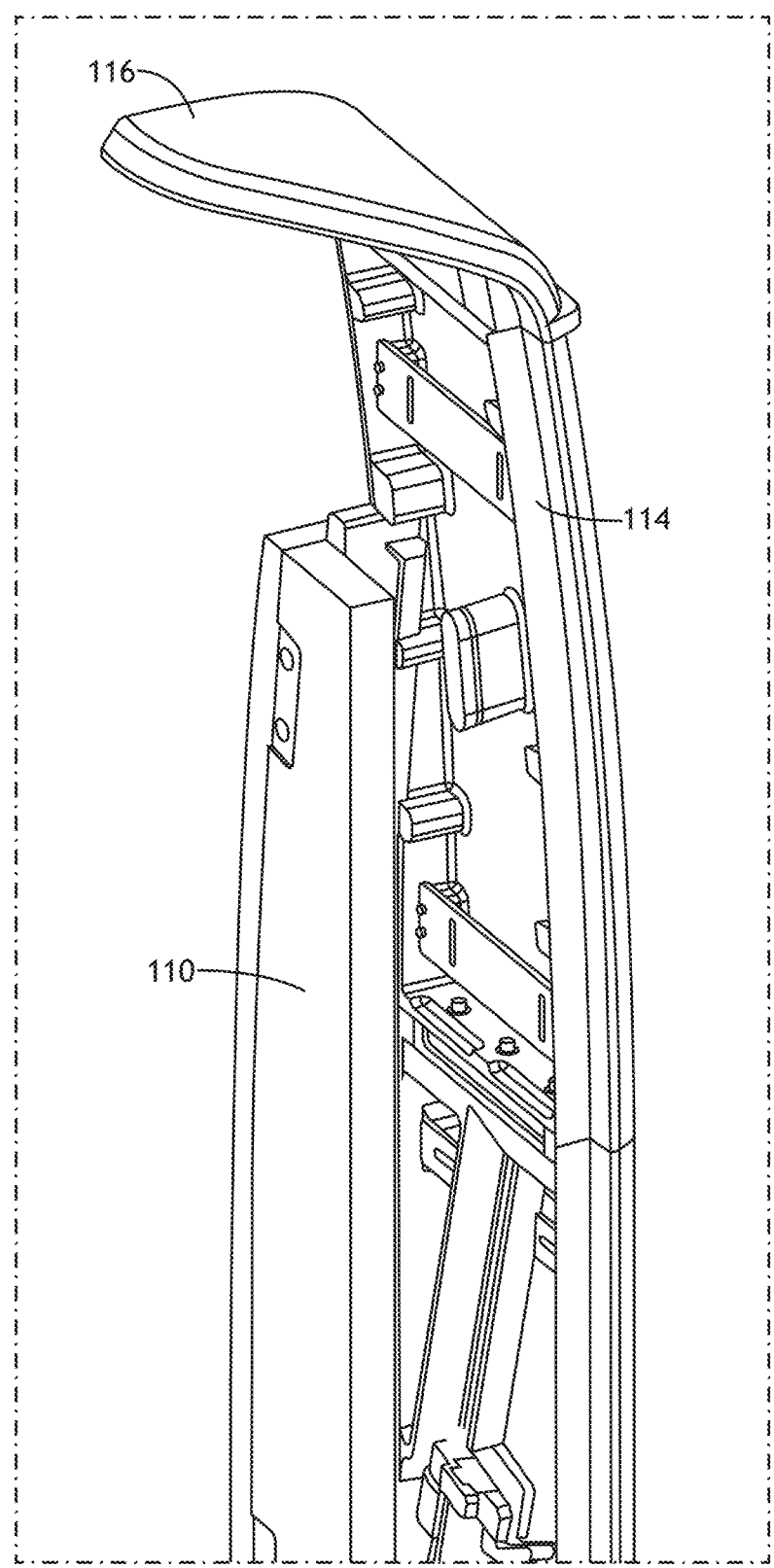
FIG. 4A is a perspective view showing a positional relationship of a top of the movable wall section relative to a fixed wall when the movable wall section is rotated and lifted, in accordance with example embodiments of this disclosure.
Figure 4B:
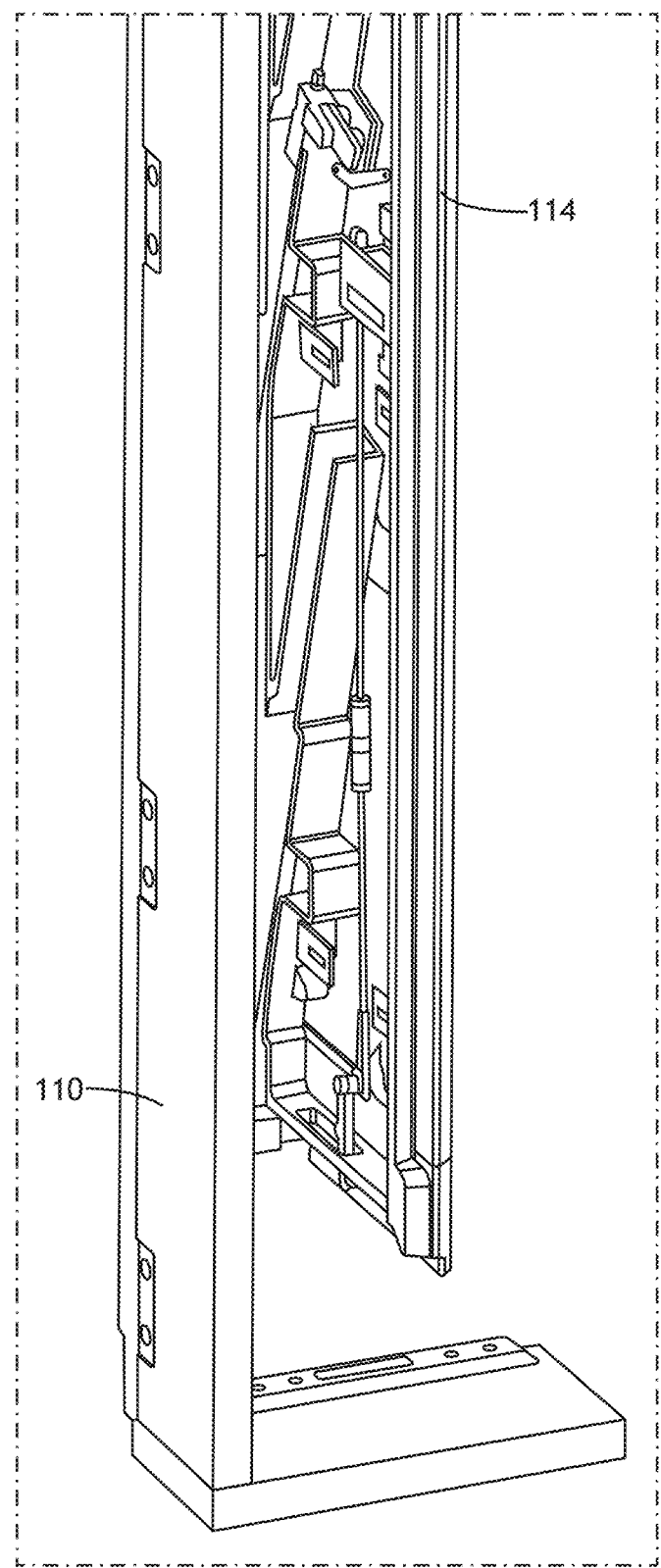
FIG. 4B is a perspective view showing a positional relationship of a bottom of the movable wall section relative to a fixed wall when the movable wall section is rotated and lifted, in accordance with example embodiments of this disclosure.
Figure 5:
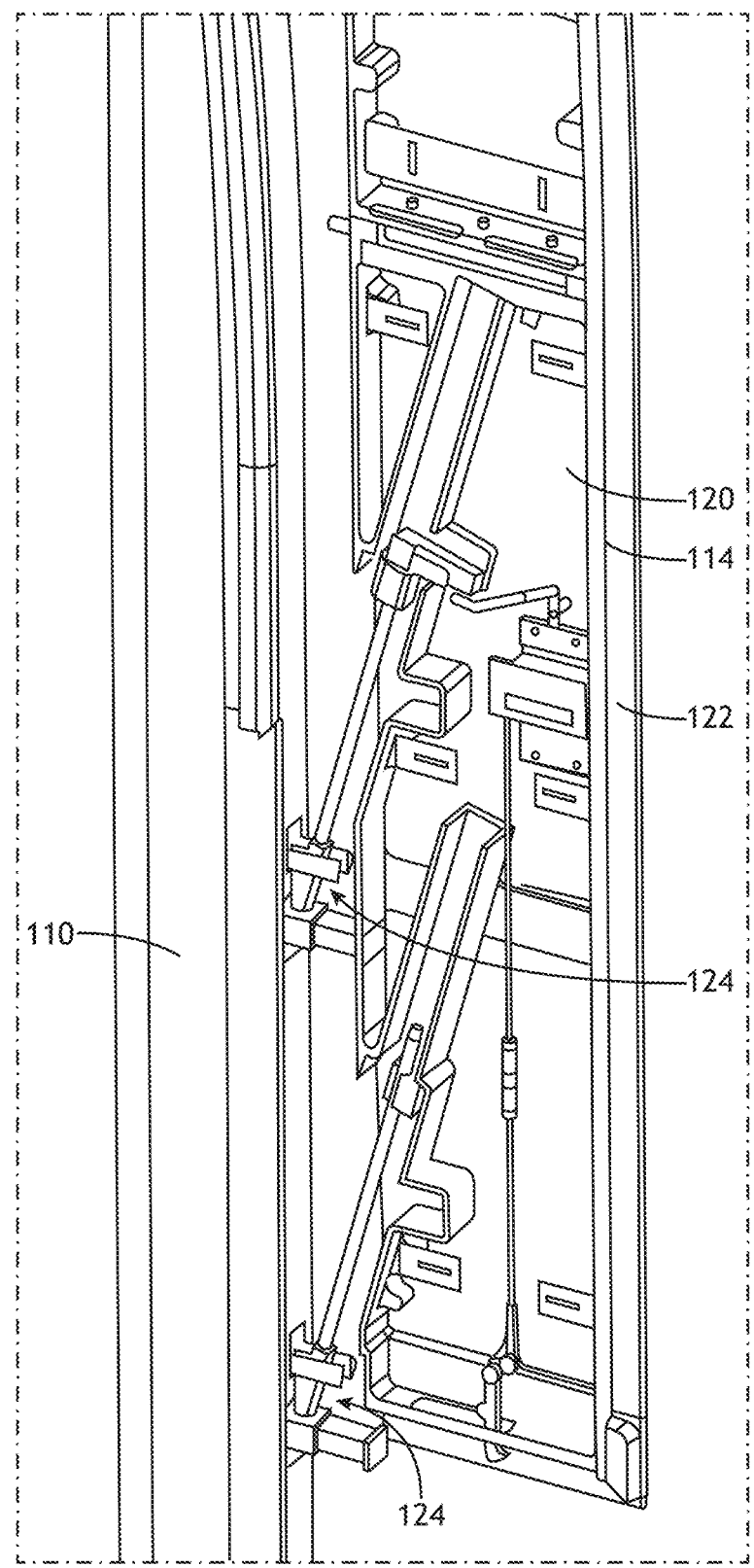
FIG. 5 is a perspective view showing the first example of the movable wall section first lifted for subsequent rotation, in accordance with example embodiments of this disclosure.
Figure 6:
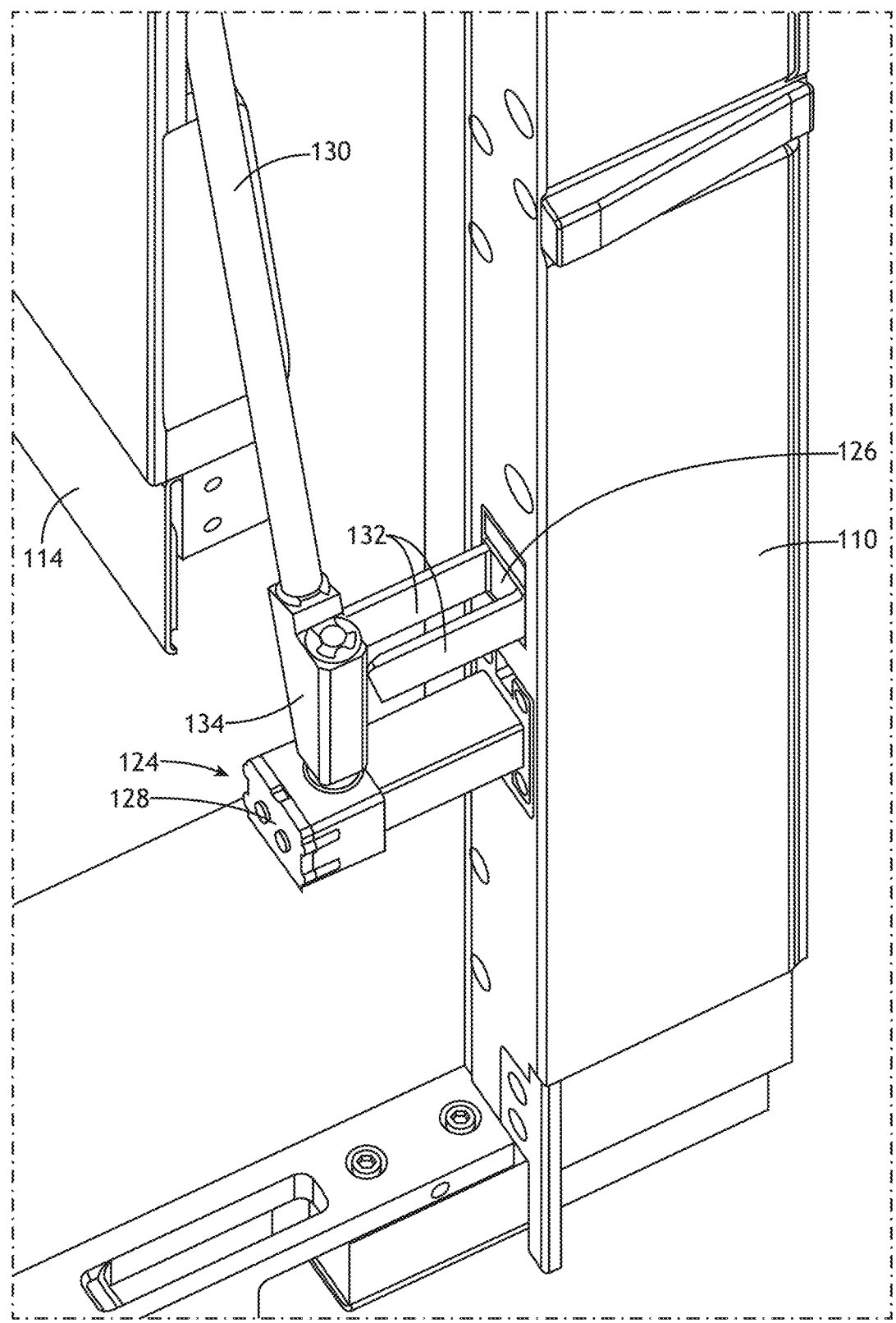
FIG. 6 is a detailed view showing a hinge mechanism operable for movable wall section translation, rotation, and lifting, in accordance with example embodiments of this disclosure.

FIGS. 4A and 4B illustrate the respective top and bottom clearances of the movable wall section 114, relative to the fixed wall 110, when the movable wall section 114 is in the second position. FIG. 5 illustrates an interface between the fixed wall 110 and the movable wall section 114 for providing the motion and support for the movable wall section 114. In embodiments, the movable wall section 114 includes an interior wall portion 120 and an exterior wall portion 122, wherein the exterior wall portion 122 mounts the hinge mechanism(s) and the interior wall portion 120 covers the mounted hinge mechanism(s). In embodiments, the movable wall section 114 is movably attached to the fixed wall 110 through at least two spaced-apart hinge mechanisms 124 that act together to control the movable wall section motion while stably supporting the movable wall section 114.

FIG. 5 illustrates a portion of one of the hinge mechanisms 124, for instance the lower hinge mechanism. In embodiments, each hinge mechanism 124 includes a rotation constraining member 126 mounted to the first fixed wall 110, a translating support 128 mounted to the first fixed wall 110, and an angled bar 130 rotatably mounted to the translating support 128. In embodiments, the rotation constraining member 126 includes spaced arms 132 defining a space therebetween for receiving a rotatable member 134 to which the angled bar 130 is mounted. As shown, the movable wall section 114 is in the second position. As such, the rotatable member 134 is removed from the space between the arms 132 and is further rotated about 90 degrees relative thereto. As further shown, the translating support 128 is translated 'outward' away from the fixed wall 110 to move the rotatable member 134 out of capture from between the spaced arms 132. By freeing the rotatable member 134 from capture, the rotatable member 134 can be rotated, for instance 90 degrees to rotate the movable wall section 114 between the first and second positions.

Figure 7A:
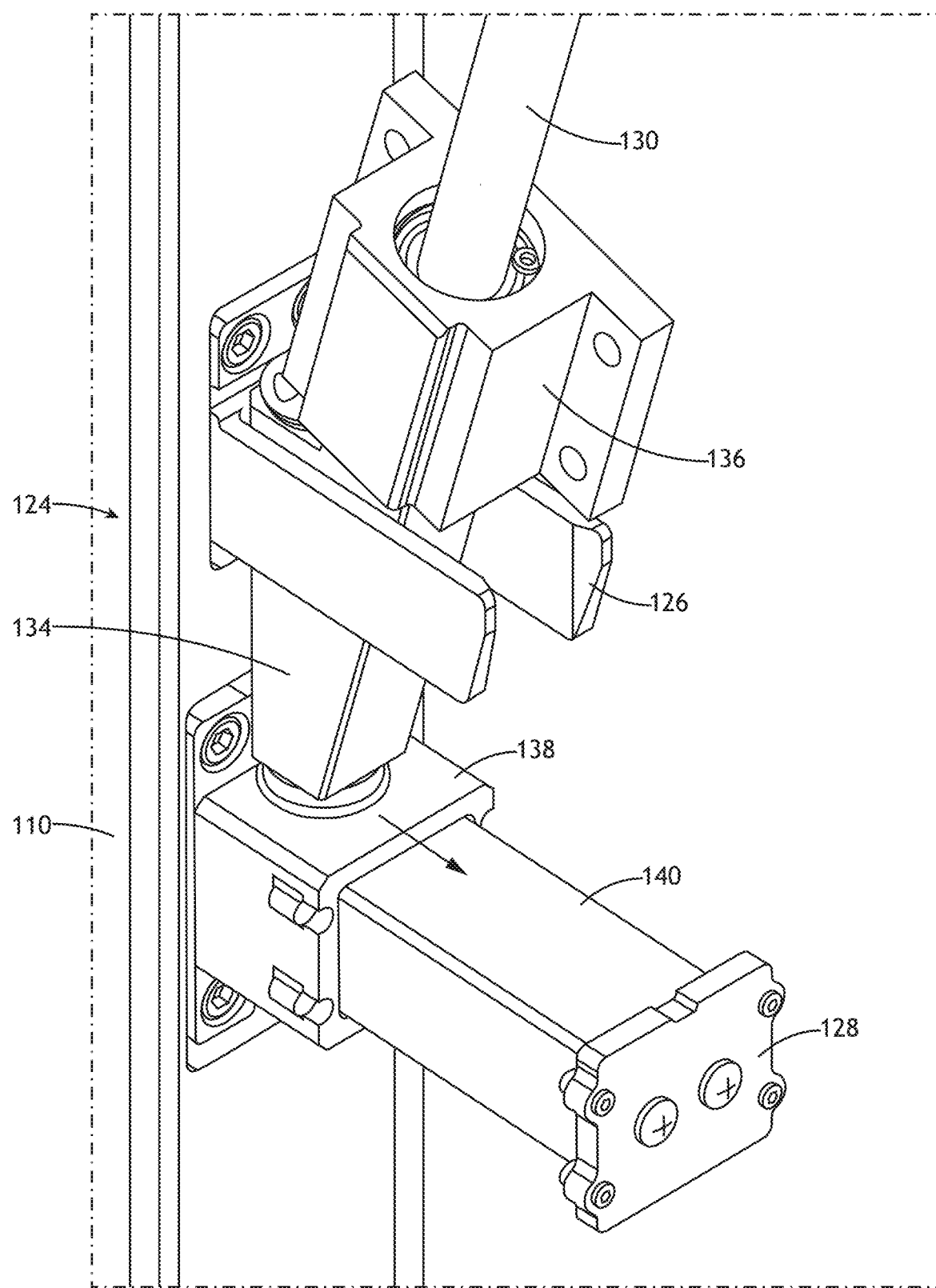
FIGS. 7A-D are perspective views showing the sequential operation of the hinge mechanism, in accordance with example embodiments of this disclosure.

FIGS. 7A-D illustrate further features and motions of the hinge mechanism 124. The hinge mechanism 124 further includes at least one sliding member 136, such as a sliding bracket, slidably mounted on the angled bar 130 and configured to be fixedly mounted to the moveable wall section, for instance mounted to the interior face of the exterior wall portion. FIG. 7A illustrates the first position of the movable wall section for 'normal' use (i.e., standard entrance width). As shown, the translating support 128 is positioned against the fixed wall 110 such that the rotatable member 134 is positioned in the rotation constraining member 126 such that the angled bar 130 resides in the vertical plane of the entrance. At the same time, the at least one sliding member 136 is in a position that corresponds to a lowest vertical position of the movable wall section. When in the first position as shown in FIG. 7A, the movable wall section is positioned in the vertical plane of the entrance, is prevented from rotating, and is preferably seated tightly against the fixed wall 110 to minimize any gap therebetween. In embodiments, the translating support 128 includes a translating square collar 138 slidably mounted on a fixed square post 140.

Figure 7B:
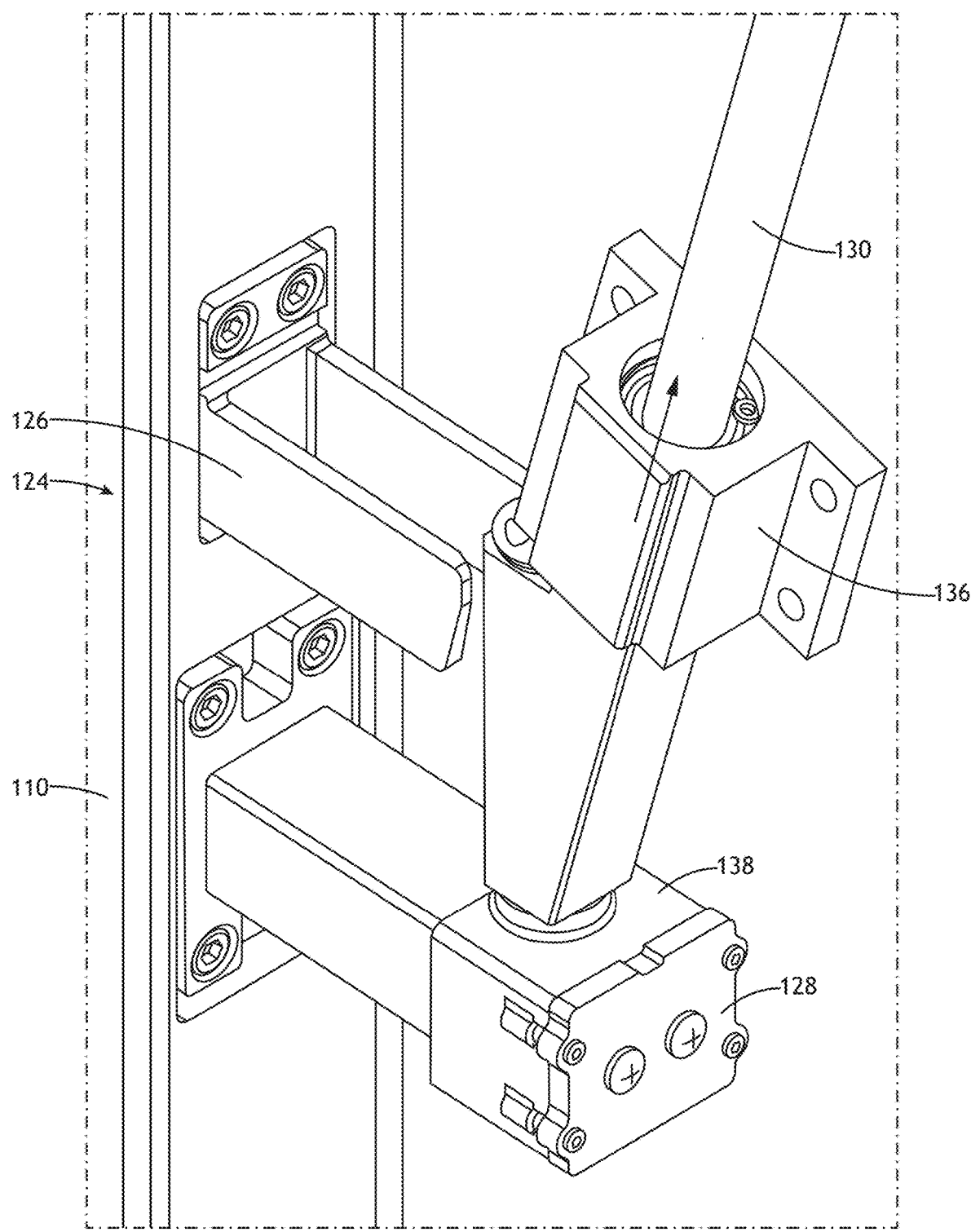

FIG. 7B illustrates an intermediate position of the movable wall section in which horizontal translational motion of the movable wall section (e.g., within the entrance) causes the square collar 138 to be translated to its outermost position to free the rotational member 134 from the rotational constraint of the rotation constraining member 126. At the same time, the at least one sliding member 136 remains at the lowest position which corresponds to the lowest vertical position of the movable wall section.

Figure 7C:
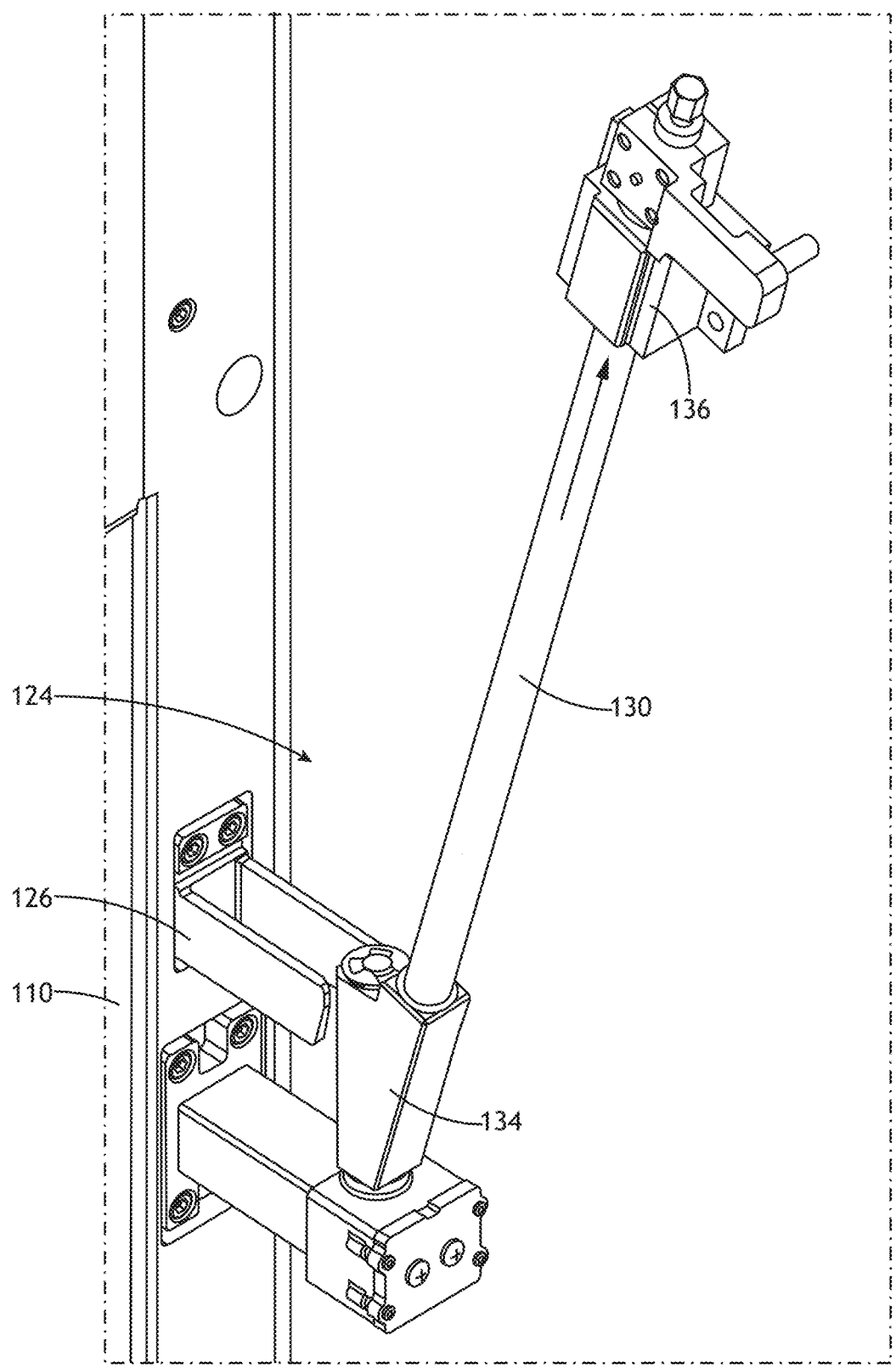

FIG. 7C illustrates a further intermediate position of the movable wall section in which the at least one sliding member 136 moves upward along the angled bar 130 to lift and further translate the movable wall section outward (e.g., within the entrance). By lifting the movable wall section, in embodiments including an overhanging wall portion, the overhanging wall portion is raised above the first fixed wall 110 such that the movable wall section can be rotated toward the second position. At the same time, the movable wall section is lifted above the floor to clear any obstacles, such as the floor pallet.

Figure 7D:
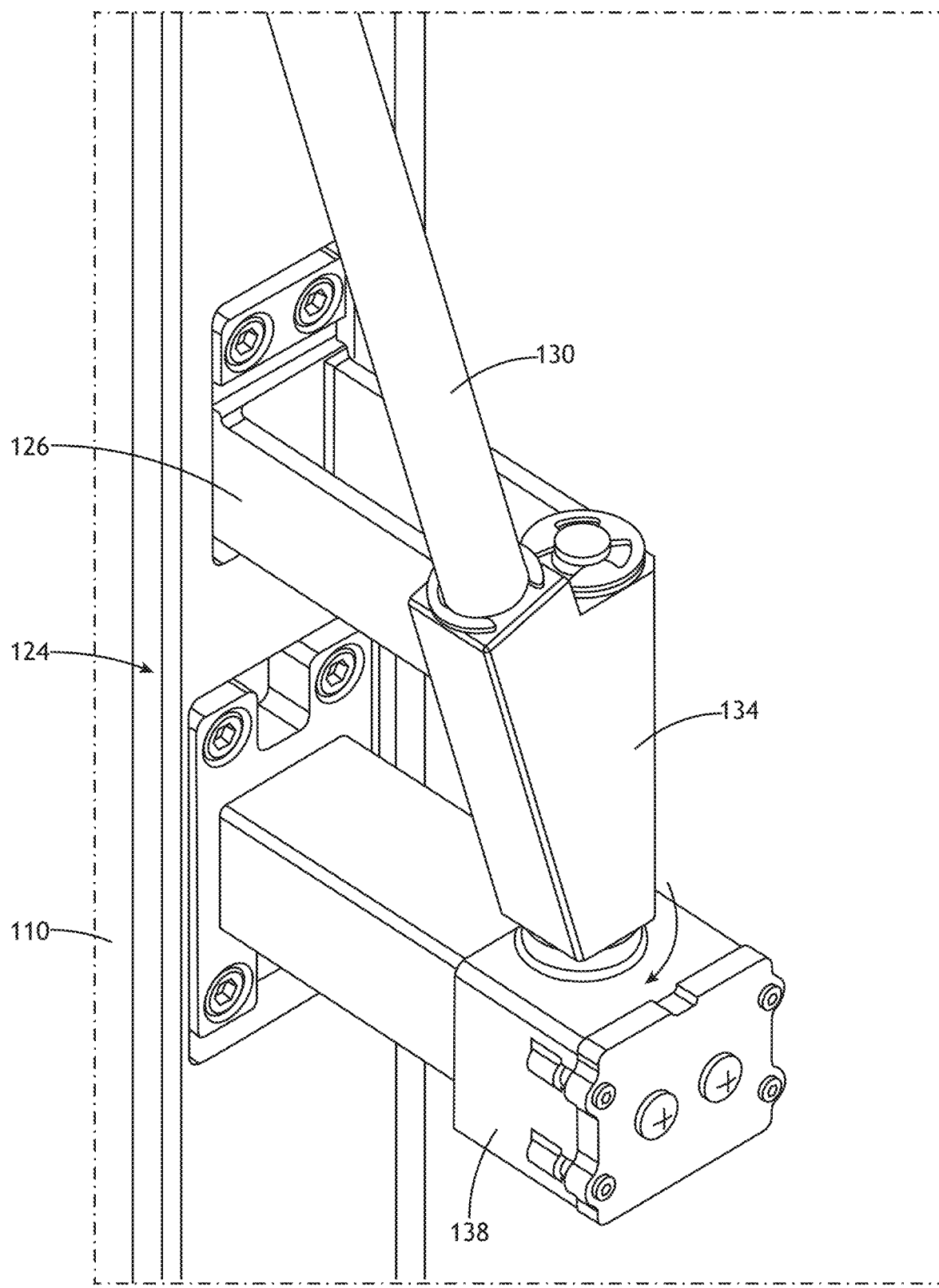

FIG. 7D illustrates the second position of the movable wall section in which the rotatable member 134 rotates relative to the square collar 138 to position the movable section against or substantially against the first fixed wall 110. The assembly may further include at least one of a lift assistance mechanism (e.g., locking gas spring), locking mechanisms for locking the movable wall section in the first and/or second positions, etc. While FIGS. 7A-D illustrate horizontal, vertical, and rotational motions performed sequentially, other sequences and synchronous motions may be performed depending on the configuration of the movable wall section.

Figure 8:
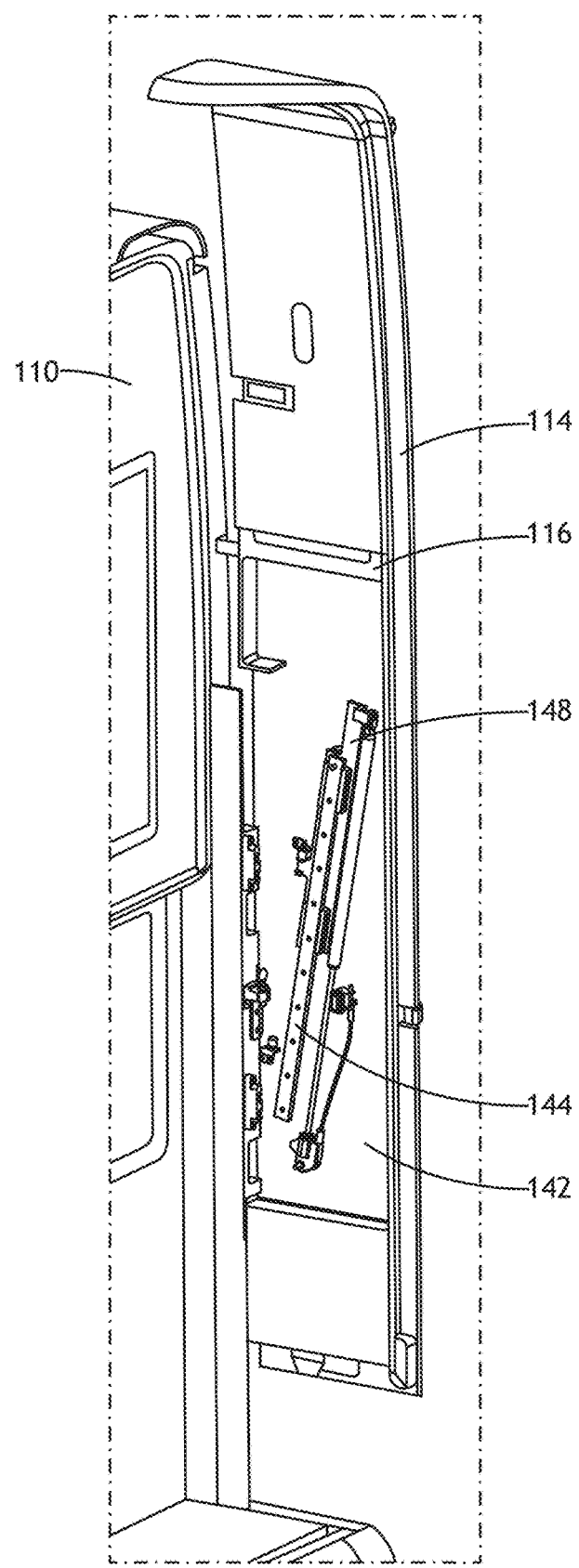
FIG. 8 is a perspective view showing a second example of a movable wall section, in accordance with example embodiments of this disclosure.
Figure 9:
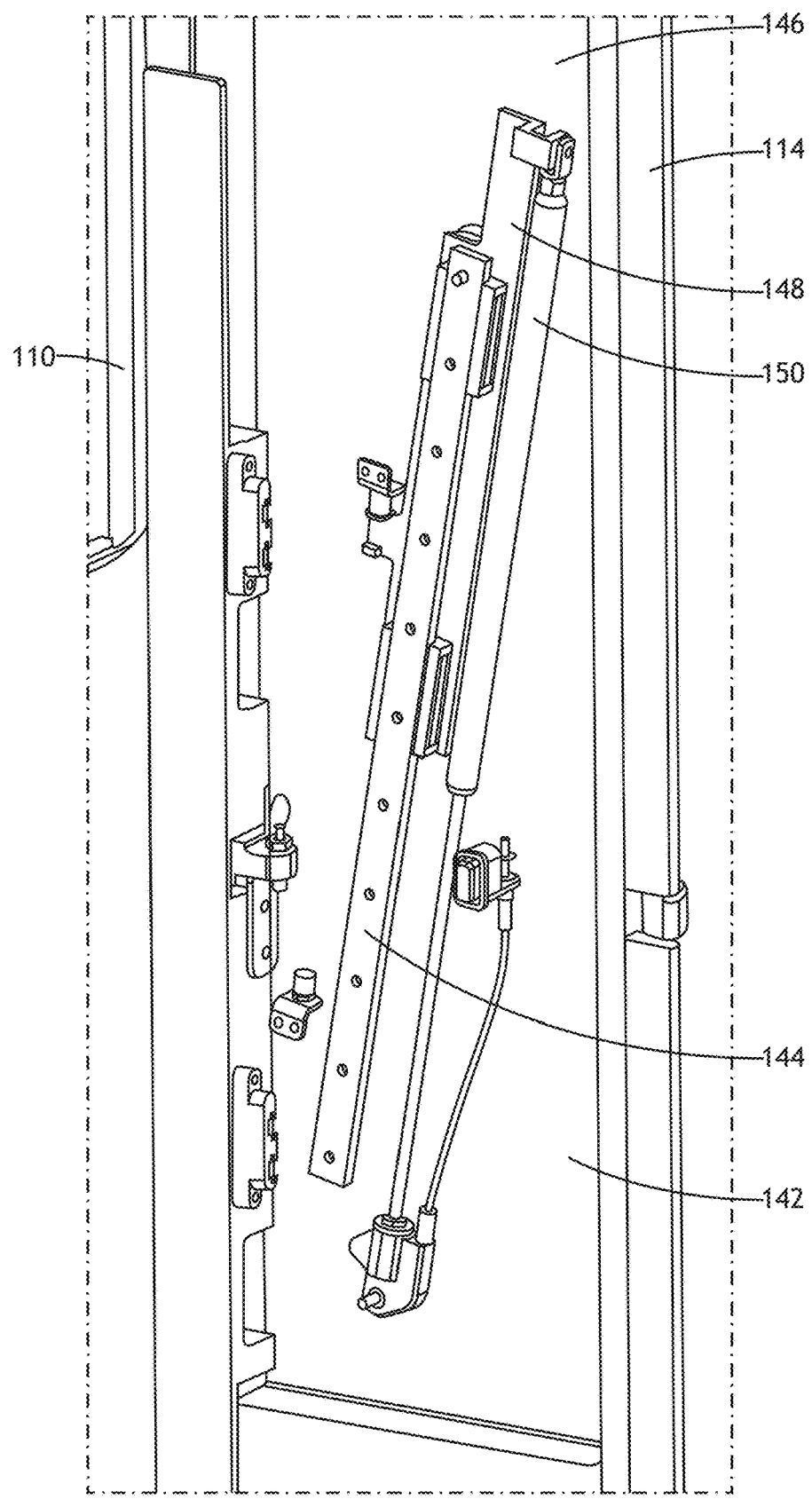
FIG. 9 is a perspective view showing a lifting mechanism associated with the second example of the movable wall section, in accordance with example embodiments of this disclosure.

FIGS. 8-11 illustrate a second example of the movable wall section 114 according to the present disclosure. FIG. 8 illustrates the movable wall section lifted but not yet rotated to the second position. Whereas the first example includes spaced hinge mechanisms for controlled motion, the second example includes a rail and carriage interface attaching the movable wall section 114 to the first fixed wall 110. In embodiments, the interface includes an interior wall panel 142 rotatably mounted to the first fixed wall 110, a rail 144 diagonally mounted to the interior wall panel 142, an exterior wall panel 146, and a carriage 148 slidably mounted to the rail and fixedly mounted to the exterior wall panel 146. FIG. 8 shows the carriage 148 positioned at the top end of the rail 144 which corresponds to the fully raised or lifted position of the movable wall section 114. FIG. 9 shows the lift assist mechanism for helping to raise the door for subsequent rotation.

In embodiments, the carriage 148 may be attached to one end of a locking gas spring 150 configured to provide lift assistance to the movable wall section. In use, lowering the movable wall section 114 may cause the locking gas spring 150 to store energy used to lift the movable wall section 114 when the gas spring 150 is unlocked by a traditional actuator configuration such as a translating cable attached to a lever.

Figure 10:
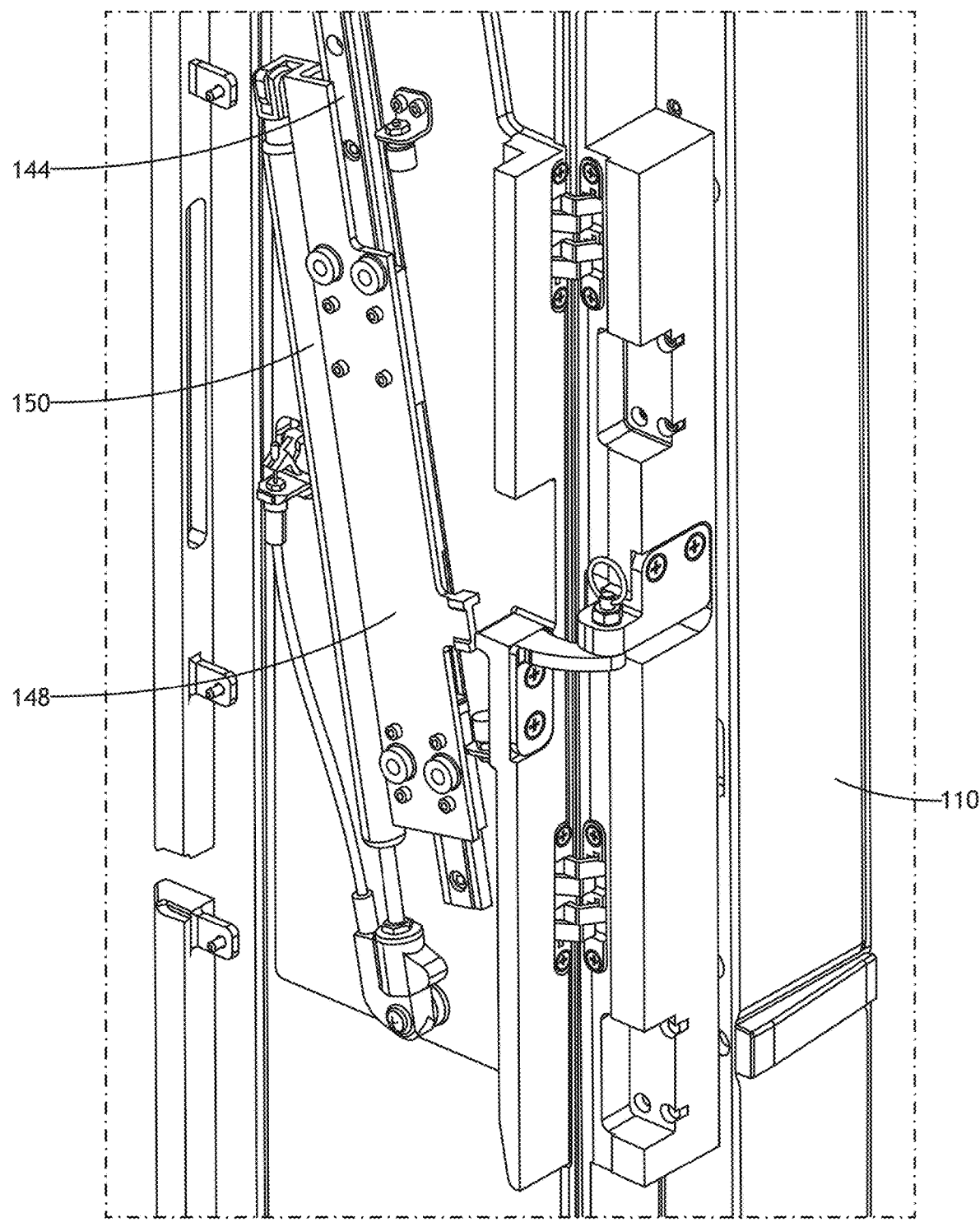
FIG. 10 is a detailed view showing portions of the lifting mechanism of the second example of the movable wall section, with the wall panels removed for clarity, in accordance with example embodiments of this disclosure.
Figure 11:
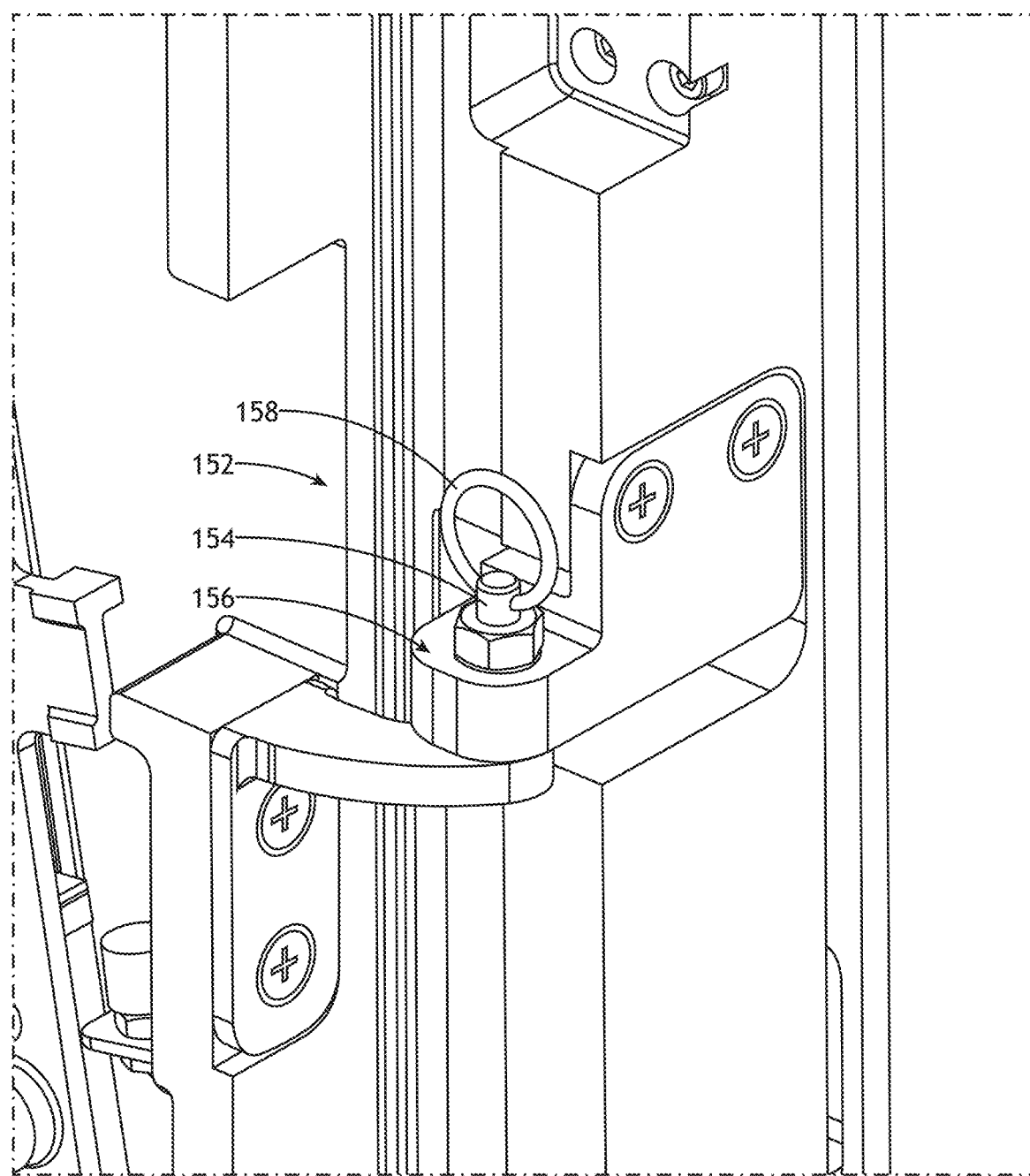
FIG. 11 is a detailed view of a pin mechanism for locking rotation of the movable wall section according to the first and second example, in accordance with example embodiments of this disclosure.

FIG. 10 shows the motion mechanism without the movable wall section. In use, motion of the sliding carriage 148 along the diagonally mounted rail 144 causes synchronous vertical and horizontal motion that lifts the moveable wall section and moves it away from the first fixed wall 110 such that the movable wall section can be rotated. FIG. 11 illustrates a non-limiting example of a pin mechanism 152 for locking the movable wall section in position. In embodiments, the pin mechanism 152 includes a spring-loaded pin 154 configured to releasably engage in a catch 156 positioned at the interface between the first fixed wall 110 and the movable wall section. In use, the pin 154 is lifted by a handle 158 to disengage the pin 154 from the catch 154 to allow the motions to move the movable wall section to the second position. Other traditional mechanism may be used to maintain the movable wall section in the first or second positions, for instance a lanyard.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A wall assembly for a passenger cabin, comprising:
a first fixed wall;
a second fixed wall positioned relative to the first fixed wall to define an interior space;
an entrance formed between the first fixed wall and the second fixed wall for accessing the interior space; and
a movable wall section movably mounted to the first fixed wall, the movable wall section movable between a first position in the entrance, and a second position in the interior space, wherein motion to move the movable wall section between the first position and the second position includes a rotational motion component and a vertical motion component.

2. The wall assembly according to claim 1, wherein the motion to move the movable wall section between the first position and the second position further includes a horizontal motion component.

3. The wall assembly according to claim 2, wherein the rotational motion component, the vertical motion component, and the horizontal motion component are performed sequentially according to a predefined motion sequence.

4. The wall assembly according to claim 1, wherein the vertical motion component is upward as the movable wall section moves from the first position to the second position, and the vertical motion component is downward as the movable wall section moves from the second position to the first position.

5. The wall assembly according to claim 1, wherein:
the vertical motion component is at least 6 inches; and
the movable wall section has a length between about 4 inches and about 6 inches.

6. The wall assembly according to claim 1, wherein the movable wall section comprises an overhanging portion that overhangs the first fixed wall when the movable wall section is in the second position.

7. The wall assembly according to claim 1, wherein:
the first fixed wall is oriented perpendicular to the entrance;
the second fixed wall is oriented perpendicular to the first fixed wall and parallel to the entrance;
the movable wall section, when in the first position, is oriented perpendicular to the first fixed wall and parallel to the second fixed wall; and
the movable wall section, when in the second position, is oriented parallel to the first fixed wall and perpendicular to the second fixed wall.

8. The wall assembly according to claim 1, wherein an interface between the first fixed wall and the movable wall section comprises:
at least one hinge mechanism including:
a rotation constraining member mounted to the first fixed wall;
a translating support mounted to the first fixed wall;
an angled bar rotatably mounted to the translating support; and
at least one bracket slidably mounted to the angled bar and fixedly mounted to the movable wall section.

9. The wall assembly according to claim 1, wherein an interface between the first fixed wall and the movable wall section comprises:
an interior wall panel rotatably mounted to the first fixed wall;
a rail diagonally mounted to the interior wall panel;
an exterior wall panel; and
a carriage slidably mounted to the rail and fixedly mounted to the exterior wall panel.

10. An aircraft passenger suite, comprising:
a first fixed wall;
a second fixed wall positioned relative to the first fixed wall to define an interior space;
an entrance formed between the first fixed wall and the second fixed wall for accessing the interior space;
a floor pallet positioned in the interior space, a portion of the floor pallet positioned at the entrance; and
a movable wall section movably mounted to the first fixed wall, the movable wall section movable between a first position in the entrance, and a second position in the interior space, wherein motion to move the movable wall section between the first position and the second position includes a rotational motion component and a vertical motion component;
wherein the movable wall section is configured to be moved from the first position to the second position to expand the entrance.

11. The aircraft passenger suite according to claim 10, wherein the motion to move the movable wall section between the first position and the second position further includes a horizontal motion component.

12. The aircraft passenger suite according to claim 11, wherein:
at least a portion of the rotational motion component, the vertical motion component, and the horizontal motion component are performed sequentially according to a predefined motion sequence; and
at least a portion of the rotational motion component, the vertical motion component, and the horizontal motion component are performed synchronously.

13. The aircraft passenger suite according to claim 10, wherein the vertical motion component is upward as the movable wall section moves from the first position to the second position, and the vertical motion component is downward as the movable wall section moves from the second position to the first position.

14. The aircraft passenger suite according to claim 10, wherein:
the vertical motion component is at least 6 inches; and
the movable wall section has a length between about 4 inches and about 6 inches.

15. The aircraft passenger suite according to claim 10, wherein the movable wall section comprises an overhanging portion that overhangs the first fixed wall when the movable wall section is in the second position.

16. The aircraft passenger suite according to claim 10, wherein:
the first fixed wall is oriented perpendicular to the entrance;
the second fixed wall is oriented perpendicular to the first fixed wall and parallel to the entrance;
the movable wall section, when in the first position, is oriented perpendicular to the first fixed wall and parallel to the second fixed wall; and
the movable wall section, when in the second position, is oriented parallel to the first fixed wall and perpendicular to the second fixed wall.

17. The aircraft passenger suite according to claim 10, wherein an interface between the first fixed wall and the movable wall section comprises:
at least one hinge mechanism including:
a rotation constraining member mounted to the first fixed wall;
a translating support mounted to the first fixed wall;
an angled bar rotatably mounted to the translating support; and
at least one bracket slidably mounted to the angled bar and fixedly mounted to the movable wall section.

18. The aircraft passenger suite according to claim 10, wherein an interface between the first fixed wall and the movable wall section comprises:
an interior wall panel rotatably mounted to the first fixed wall;
a rail diagonally mounted to the interior wall panel;
an exterior wall panel; and
a carriage slidably mounted to the rail and fixedly mounted to the exterior wall panel.

19. A wall assembly, comprising:
a fixed wall; and a movable wall movably mounted to the fixed wall, the movable wall movable between a first position perpendicular to the fixed wall and a second position parallel to the fixed wall;

wherein the movable wall when in the second position is at least 6 inches higher that the movable wall when in the first position.

20. The wall assembly according to claim 19, wherein the movable wall comprises an overhanging portion that overhangs the fixed wall when the movable wall is in the second position.

* * * * *